United States Patent [19]

Butler et al.

[11] Patent Number: 4,587,852
[45] Date of Patent: May 13, 1986

[54] CONVEYOR BELT TENSION SENSING

[75] Inventors: Joseph W. Butler, Appleby Magna; Edward E. Jarvis, Mickleover, both of England

[73] Assignee: Coal Industry (Patents) Limited, London, England

[21] Appl. No.: 622,644

[22] Filed: Jun. 20, 1984

[30] Foreign Application Priority Data

Jun. 21, 1983 [GB] United Kingdom ................ 8316859

[51] Int. Cl.⁴ ............................................. G01N 3/08
[52] U.S. Cl. ...................................... 73/826; 340/676
[58] Field of Search ................ 73/763, 767, 768, 771, 73/773, 826, 828, 862.38, 862.64; 198/502, 856; 340/676

[56] References Cited

U.S. PATENT DOCUMENTS

| | | | |
|---|---|---|---|
| 3,656,137 | 4/1972 | Ratz | 340/676 |
| 3,963,115 | 6/1976 | Teske et al. | 198/856 |
| 4,020,945 | 5/1977 | Takeno et al. | 198/856 |
| 4,429,580 | 2/1984 | Testa et al. | 73/768 |

Primary Examiner—Stewart J. Levy
Assistant Examiner—Robert R. Raevis
Attorney, Agent, or Firm—James C. Wray

[57] ABSTRACT

The tension of a conveyor belt having at least one connection joint including joint components provided on the ends of both connected belt portions is sensed by mounting a tensile force sensor between the joint components and deriving a signal indicative of the sensed tension. The derived signal being transmitted by radio transmitter means to receiver and monitoring means.

12 Claims, 5 Drawing Figures

CONVEYOR BELT TENSION SENSING

This invention relates to conveyor belt tension sensing.

In particular, the present invention relates to sensing the tension in conveyor belts including connecting joints between adjacent ends of conveyor belt sections.

It has previously been proposed to sense conveyor belt tension by weaving load transducers into patches of belting material, each patch comprising a metal plate carrying a strain gauge bridge arrangement. Four of these patches were adhered to a section of conveyor belting which in turn could be inserted into the conveyor belt system. The output signals from the strain gauges were fed to sockets which were set in the side of the belt and into which suitable recorders could be plugged. Unfortunately, the proposals had several shortcomings including the requirement for careful calibration to allow for belt stretch. Also only average belt tension could be measured. The proposed system was awkward to install and suitable for use on specific types of belt. Moreover, it was necessary for the recorders to be ridden on the surface of the belt during testing. This required the stopping of the belt to connect up and to disconnect the recorders. Such a proposed system enabled the tension to be sensed only in the top or carrying run of the belt.

An object of the present invention is to provide improved belt tension sensing which tends to overcome or reduce the above mentioned problems.

Accordingly one aspect of the present invention provides a method of sensing tension in a conveyor belt having at least one connecting joint including joint components provided on the ends of both connected belt portions, comprises the steps of mounting a sensor for sensing tensile force between the joint components provided on the ends of both connected belt portions, deriving a signal from the sensor which is indicative of sensed tensile force, and transmitting a signal dependent on the derived signal.

Advantageously, the signal is transmitted by a radio transmitter.

Advantageously, the transmitted radio signal is received by receiver means extending along at least a portion of the conveyor belt.

Preferably, switch means for the transmitter are operable from stationary control means remote from the conveyor belt.

According to another aspect of the present invention, apparatus for sensing tension in a conveyor belt having at least one connecting joint including joint components provided on both connected belt portions, comprises a support link having two opposite ends adapted for connection between the joint components on both belt portions, the support link carrying a sensor for sensing tensile force applied to the support link from the joint components, and a transmitter for transmitting signal means indicative of the sensed tensile force.

Advantageously, the transmitter is a radio transmitter.

Preferably, the transmitted radio signal is received by receiver means adapted to extend along at least a portion of the conveyor belt.

Preferably, switch means for the transmitter are provided, the switch means being operable from a stationary control mounted remote from the conveyor belt.

The present invention also provides a conveyor belt installation having at least one connecting joint including joint components provided on both connected belt portions, the conveyor belt comprising a support having two opposite ends adapted for connection between the joint components on both belt portions, the support carrying a sensor for sensing tension in the belt applied to the sensor from the joint components, and a transmitter for transmitting signal means indicative of the sensed belt tension.

Advantageously, a plurality of supports are provided across the conveyor belt each support having two opposite ends adapted for connection between the joint components on both belt portions.

Advantageously, the or each transmitter is a radio transmitter.

Preferably, the or each transmitted radio signal is received by receiver means extending along at least a portion of the conveyor belt.

Preferably, switch means for the or each transmitter is provided, the switch means being operable from a stationary control mounted remote from the conveyor belt.

By way of example only, one embodiment of the present invention will be described with reference to the accompanying drawings, in which.

Figure 1:
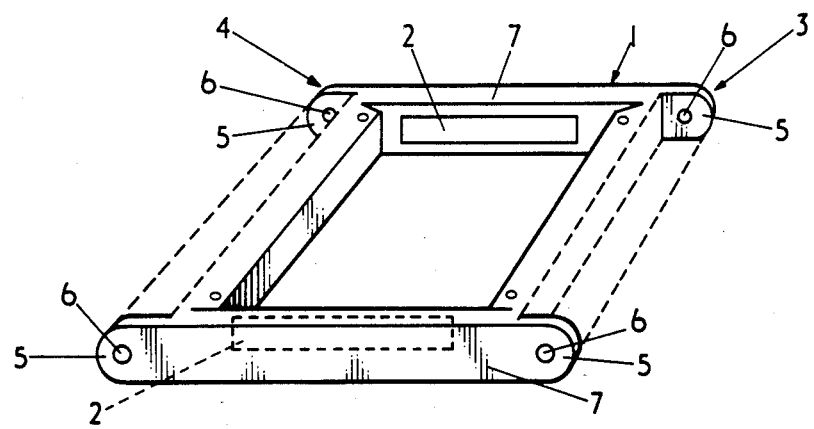
FIG. 1 is a perspective view of a detail of the apparatus according to the invention.
Figure 2:
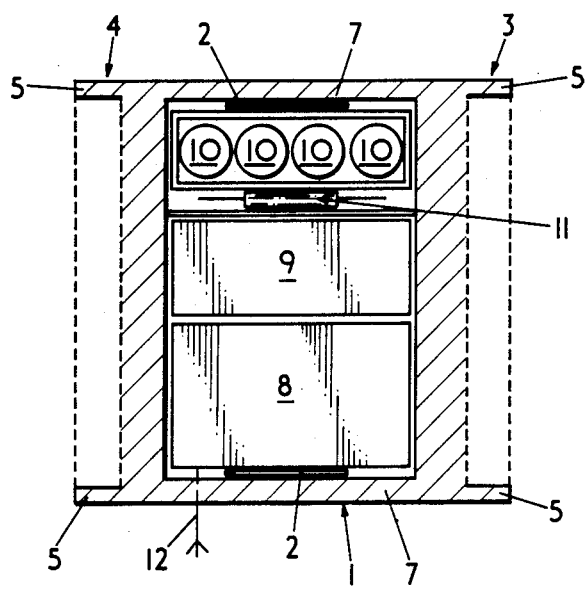
FIG. 2 is an incomplete diagrammatic section taken through the apparatus according to the invention.
Figure 3:
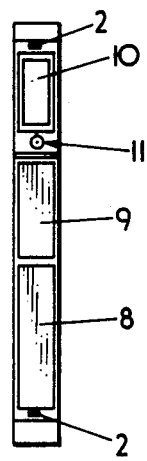
FIG. 3 is an incomplete diagrammatic end view of the apparatus of FIG. 2.

FIGS. 1, 2 and 3 show a rigid support link 1 for carrying equipment including tensile force sensor means 2 and transmitter means omitted from FIG. 1 but illustrated in FIGS. 2 and 3. The support link is adapted for mounting between the joint components of a belt connecting joint and has opposite ends 3 and 4 adapted for connection to joint components on ends of belt portions, respectively. As seen in FIG. 1 each end 3 and 4 has two outwardly projecting lugs 5 provided with cross holes 6 for accommodating connecting rods (not shown) which in use extend across the full width of the conveyor belt.

As shown in FIGS. 1 and 2 the rigid support link 1 carries tensile force sensor means 2 constituted by strain gauges mounted on the inner side wall of each longitudinally extending limb 7 which are of sufficiently rigid construction to avoid bending problems when subjected to belt tension. The strain gauges are mounted in a wheatstone bridge arrangement (not shown) such that an output signal is derived which is indicative of belt tension. The derived output signal is fed to a radio transmitter 8 via an amplifier 9. Power is supplied to the transmitter and to the amplifier from a set of removable batteries 10. To conserve battery life switch means 11 are provided, the switch means being operable between 'on' and 'off' modes from a stationary control mounted remote from the belt conveyors. Thus, the transducer can be switched 'on' or 'off' with the conveyor belt running. The switch means 11 may, for example, comprise magnetic change over reed switches which could be switched as the belt passes in close proximity to a series of magnetic strips. The strips could be located at any desired location along the conveyor belt and arranged to switch the switch means 'on' or 'off' as desired.

The output signal from the radio transmitter 8 is transmitted via an aerial indicated by reference number 12 in FIG. 2. In practice the aerial may be constituted by the support link, the metal link being covered with electrically insulating material. In addition to or as an alternative the aerial may comprise an element embedded in the conveyor belt.

Figure 4:
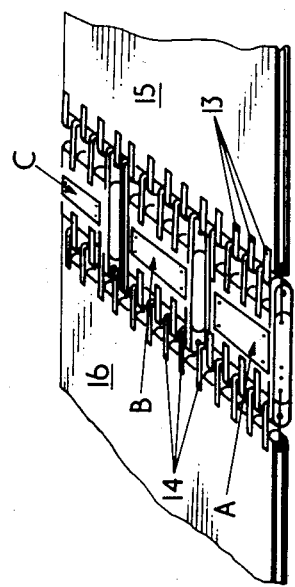
FIG. 4 is a perspective view showing the apparatus in an operational condition.

FIG. 4 shows a plurality of similar tension sensing transducers A, B, C . . . mounted in series across the width of the conveyor belt. Opposite ends of each support link being connected between the joint components 13, 14 provided on the ends of the connected belt portions 15, 16, respectively.

With such an arrangement the radio transmitters of the different transducers are adapted to transmit at different frequencies so as to avoid interference and enable the signals to be identified.

Figure 5:
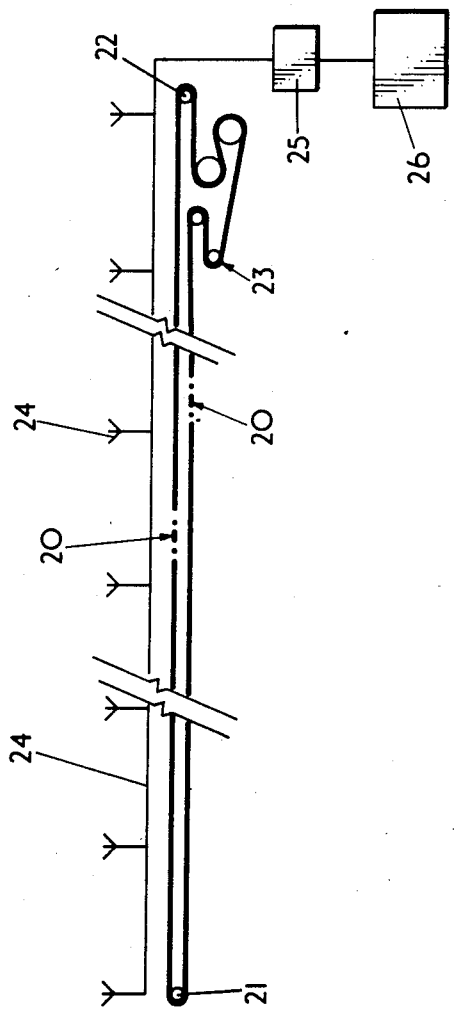
FIG. 5 is a line diagram illustrating the present invention.

FIG. 5 shows a typical conveyor belt installation with the conveyor belt comprising a plurality of connecting joints 20 including tension sensing transducers. The conveyor belt has return rollers 21, 22 and a drive arrangement 23.

The signal transmitted by the tension sensing transducers are received by receiver means including a receiver pick-up aerial 24 extending along the conveyor belt, a multi channel signal receiver unit 25 and a recorder 26 arranged to monitor all the received signals.

The present invention provides a convenient and reliable method of sensing conveyor belt tension which can be performed without interrupting operation of the belt system, the tension being sensed throughout the complete running cycles of the conveyor belt. Moreover, the present invention enables the tension to be sensed at different locations across the width of the belt. Thus, for example, the tension adjacent both edges of the belt can be compared one against the other or compared with the tension sensed at a more central location across the belt.

We claim:

1. A method of sensing tension in a conveyor belt having at least one connecting joint including joint components provided on the ends of both connected belt portions, comprising the steps of mounting a sensor for sensing tensile force between the joint components provided on the ends of both connected belt portions, deriving a signal from the sensor which is indicative of sensed tensile force, and transmitting a signal dependent on the derived signal, wherein the signal is transmitted by a radio transmitter.

2. A method as claimed in claim 1, wherein the transmitted radio signal is received by receiver means extending along at least a portion of the conveyor belt.

3. A method as claimed in claim 2, in which switch means for the transmitter are operable from stationary control means remote from the conveyor belt.

4. Apparatus for sensing tension in a conveyor belt having at least one connecting joint including joint components provided on both connected belt portions, comprising a support link having two opposite ends for connecting the joint component on both belt portions, the support link carrying a sensor for sensing tensile force applied to the support link from the joint components, and a transmitter for transmitting signal means indicative of the sensed tensile force, wherein the transmitter is a radio transmitter.

5. Apparatus as claimed in claim 4, in which the transmitted radio signal is received by receiver means adapted to extend along at least a portion of the conveyor belt.

6. Apparatus as claimed in claim 5, in which switch means for the transmitter are provided, the switch means being operable from a stationary control mounted remote from the conveyor belt.

7. A conveyor belt installation having at least one connecting joint including joint components provided on both connected belt portions, the conveyor belt comprising a support having two opposite ends for connecting the joint components on both belt portions, the support carrying a sensor for sensing tension in the belt applied to the sensor from the joint components, and a transmitter for transmitting signal means indicative of the sensed belt tension, wherein a plurality of supports are provided across the conveyor belt, each support having two opposite ends for connecting the joint components on both belt portions, and wherein each transmitter is a radio transmitter.

8. A conveyor belt installation as claimed in claim 7, in which transmitted radio signals are received by receiver means extending along at least a portion of the conveyor belt.

9. A conveyor belt installation as claimed in claim 8, in which switch means for each transmitter is provided, the switch means being operable from a stationary control mounted remote from the conveyor belt.

10. A method of sensing tension in a conveyor belt having at least one connecting joint including joint components provided on the ends of both connected belt portions, comprising the steps of:
(a) mounting a sensor for sensing tensile force between the joint components provided on the ends of both connected belt portions;
(b) deriving a signal from the sensor which is indicative of sensed tensile force;
(c) transmitting said signal by a radio transmitter;
(d) receiving said signal by receiver means extending along at least a portion of the conveyor belt;
(e) operating switch means for the transmitter from stationary control means remote from the conveyor belt.

11. Apparatus for sensing tension in a conveyor belt having at least one connecting joint including joint components provided on both connected belt portions, comprising:
(a) a support link having two opposite ends adapted for connecting the joint components on both belt portions;
(b) a sensor for sensing tensile force applied to the support link from the joint components, said sensor being carried by said support link;
(c) a radio transmitter for transmitting signal means indicative of the sensed tensile force;
(d) receiver means for receiving transmitted radio signals, said receiver means extending along at least a portion of the conveyor belt;
(e) switch means for the transmitter operable from a stationary control mounted remote from the conveyor belt.

12. A conveyor belt installation having at least one connecting joint including joint components provided on both connected belt portions, the conveyor belt comprising:

(a) plural supports each having two opposite ends for connecting the joint components on both belt portions;
(b) a sensor carried by each support for sensing tension in the belt applied to the sensor from the joint components;
(c) a radio transmitter carried by each support for transmitting signals indicative of the sensed belt tension;
(d) receiver means extending along at least a portion of the conveyor belt for receiving the transmitted signals;
(e) switch means for each transmitter operable from a stationary control mounted remote from the conveyor belt.

* * * * *